United States Patent [19]

Sakakibara et al.

[11] Patent Number: 4,905,140

[45] Date of Patent: Feb. 27, 1990

[54] SEMICONDUCTOR INTEGRATED CIRCUIT DEVICE

[75] Inventors: Yasuhiro Sakakibara, Kodaira; Isamu Kobayashi, Tokyo; Yoshinori Suzuki, Kodaira, all of Japan

[73] Assignees: Hitachi, Ltd.; Hitachi Microcomputer Engineering, Ltd., both of Tokyo, Japan

[21] Appl. No.: 96,912

[22] Filed: Sep. 16, 1987

Related U.S. Application Data

[62] Division of Ser. No. 768,112, Aug. 21, 1985.

[30] Foreign Application Priority Data

Aug. 22, 1984 [JP] Japan ................................. 59-173329

[51] Int. Cl.[4] .......................... G06F 9/00; G06F 13/00
[52] U.S. Cl. ...................................... 364/200; 364/900
[58] Field of Search ... 364/200 MS File, 900 MS File

[56] References Cited

U.S. PATENT DOCUMENTS

| 4,153,933 | 5/1979 | Blume, Jr. et al. | 364/200 |
|---|---|---|---|
| 4,298,934 | 11/1981 | Fischer | 364/200 |
| 4,450,524 | 5/1984 | Oberman | 364/200 |
| 4,482,950 | 11/1984 | Oshkhunia et al. | 364/200 |
| 4,542,453 | 9/1985 | Patrick et al. | 364/200 |
| 4,636,945 | 1/1987 | Tanagawa | 364/200 |
| 4,667,285 | 5/1987 | Suzuki et al. | 364/900 |
| 4,670,838 | 6/1987 | Kawata | 364/200 |
| 4,698,750 | 10/1987 | Wilkie et al. | 364/200 |
| 4,716,521 | 12/1987 | Nagae | 364/200 |
| 4,769,767 | 9/1988 | Hilbrink | 364/200 |
| 4,780,819 | 10/1988 | Kashiwagi | 364/200 |
| 4,794,525 | 12/1988 | Pickert et al. | 364/900 |
| 4,794,558 | 12/1988 | Thompson | 364/900 |

FOREIGN PATENT DOCUMENTS 0109504 5/1984 European Pat. Off. .

Primary Examiner—Andrew J. James
Assistant Examiner—Viet Q. Nguyen
Attorney, Agent, or Firm—Antonelli, Terry & Wands

[57] ABSTRACT

In a one-chip microcomputer, an EPROM is formed together with a ROM and RAM on one semiconductor substrate. Data such as fixed data necessary in the microcomputer can be changed by the use of the EPROM. In case data are to be written in the EPROM, an EPROM writer is used. This EPROM writer outputs write data to the EPROM and checks (or verifies) the data written in the EPROM immediately thereafter. If any error is detected, the subsequent data write is interrupted. In order to inhibit the unnecessary operation interruption in case the address designated by the EPROM writer comes out of the range of the EPROM, the checking (or verifying) data signal to be fed from the one-chip microcomputer to the EPROM writer is forcibly set at a level which indicates satisfactory operation of the EPROM.

15 Claims, 2 Drawing Sheets

SEMICONDUCTOR INTEGRATED CIRCUIT DEVICE

This is a divisional of application Ser. No. 768,112, filed Aug. 21, 1985.

BACKGROUND OF THE INVENTION

The present invention relates to a semiconductor integrated circuit device and, more particularly, to a technique effective for use in a one-chip microcomputer in which a ROM (i.e., Read Only Memory) to be stored with a data processing program is constructed of an EPROM (i.e., Electrically Programmable Read Only Memory).

In one-chip microcomputers, a predetermined data processing operation is executed in accordance with the program which is written in the built-in ROM. Prior to the present invention, we have conceived the use of an EPROM as the built-in ROM. This use of an EPROM makes it possible to promptly provide a one-chip microcomputer which has the data processing function desired by the user, while, at the same time, improving the mass productivity. If a mask type ROM is used as the aforementioned ROM, more specifically, it takes time to fabricate a variety of masks for writing the program.

In case an EPROM is used as above, it would be convenient to conduct the writing operation by the use of an EPROM writer already existing in the art. As compared with the address space in the microcomputer, however, the ratio to be occupied by the EPROM is far smaller, e.g., 4K (4K×8 bits) at most of the address space of 8K. As a result, a large number of errors are caused if the writing operation is conducted by use of the existing EPROM writers (e.g., 8K×8 bits=64 Kbits) having the same address space as that of the microcomputer. In case such an existing EPROM writer is used, more specifically, it is desirable that the construction of the usable EPROM writer not be restricted. In accordance with the existing EPROM writer, the address data are renewed sequentially from the start address, and the data to be written are sequentially outputted. The EPROM writer reads out the data written in the EPROM and checks them each time the writing operation into one address is executed. If, in this case, the start address of the EPROM is conveniently coincident with that of the EPROM, the data are written in the EPROM in a normal manner. However, the address space to be given to the built-in EPROM is not always designed to have a range convenient for the EPROM writer. In case the address data outside of the address range of the EPROM are outputted from the EPROM writer at the start of the data writing operation, no data will be written in the EPROM. In this case, it is substantially impossible to check (verify) the write data after the data writing operation is instructed, because the address data designate memories other than the EPROM. As a result, the errors, which should not exist, are detected by executing the verifying operation. Thus, in the operation to write the address designation in which the EPROM is present, its check (or verification) can be made, but all data become erroneous for the remaining write check so that no continuous write is conducted. Incidentally, a high-grade EPROM writer capable of arbitrarily designate the addressing range is presently available, but has a high price and raises a problem in distribution.

Incidentally, an example of an EPROM referred to above is disclosed in Japanese Patent Laid-Open No. 54-152933.

SUMMARY OF THE INVENTION

An object of the present invention is to provide a semiconductor integrated circuit device which has its external terminal multi-functioned by a simple construction.

Another object of the present invention is to provide a semiconductor integrated circuit device which is equipped with such an EPROM that can be written with data by an EPROM writer without the problem noted above.

These and other objects and novel features of the present invention will become apparent from the description to be made herein with reference to the accompanying drawings.

Representative examples of the present invention to be disclosed herein will now be briefly described. It is made possible to write a programmable ROM by means of, a simple writer by adding a function to discriminate a total address space, which is assigned to the programmable ROM to be stored with a data processing program, and a function to send out a signal identical to a blank to the output when an address is provided to the EPROM from the writer which is different from the address space assigned to the EPROM.

DESCRIPTION OF THE PREFERRED EMBODIMENT

Figure 1:
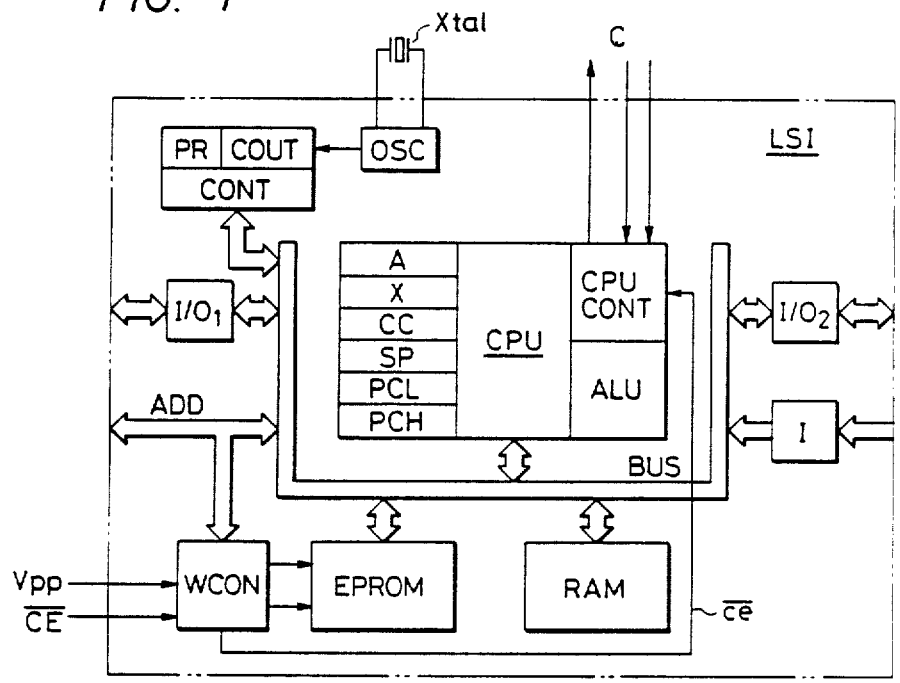
FIG. 1 is a block diagram showing one embodiment of the one-chip microcomputer to which the present invention is applied.

FIG. 1 is a block diagram showing the embodiment of the one-chip microcomputer to which the present invention is applied.

A rectangular encircled by double-dotted lines in FIG. 1 indicates an integrated circuit LSI. The respective circuit blocks formed in the rectangular construct the one-chip microcomputer as a whole and are formed in one semiconductor substrate made of silicon by known semiconductor integrated circuit device fabricating techniques.

Indicated by a symbol CPU is a micro processor which has its major component blocks exemplified as representatives. Specifically: symbol A indicates an accumulator; symbol X an index register; symbol CC a condition code register; symbol SP a stack pointer; symbols PCH and PCL program counters; symbol CPU-CONT a CPU controller; and symbol ALU an arithmetic logic operation unit.

The construction of such a microprocessor CPU is well known in the art, and is shown, for example, by "Fundamentals of Microcomputer" published by on Apr. 10, 1983 by KK OHM and written by Koji YADA. Accordingly, and its detailed description is omitted.

Indicated at symbols I/O$_1$ and I/O$_2$ are input/output ports each having a data transmission direction register therein. The input/output port I/O$_1$ can be controlled by a control circuit WCON, and its specific example will be described later with reference to FIG. 3. On the other hand, symbol I indicates an input only port.

Indicated at symbol OSC is an oscillator for generating a highly accurate reference frequency signal by making use of a quartz crystal unit Xtal attached externally, although not especially limited thereto. Clock pulses necessary for the microprocessor CPU are generated by that reference frequency signal. This reference frequency signal is used as a reference time pulse of a timer, too. This timer is composed of a counter COUT, a prescaler PR and a controller CONT.

Indicated at symbol RAM is a random access memory which is used mainly as a memory circuit for temporary data.

Indicated at symbol EPROM is an electrically programmable read only memory which is to be written with a program for a variety of data processings.

The respective circuit blocks described above are connected around the micro processor CPU with one another through a bus BUS. This bus contains a data bus and an address bus. In the bus BUS, incidentally, the address bus ADD is linked to the external terminal and can be linked directly to the EPROM.

In the microcomputer of the present embodiment, the aforementioned EPROM is used, and there is provided the control circuit WCON for controlling the writing operation of the EPROM and so on. The control circuit WCON receives a chip enable signal through an external terminal $\overline{CE}$ to enable the data to be written in the EPROM if the chip enable signal is in an EPROM direct access mode (or at a low level). If in the EPROM direct access mode, the control circuit WCON outputs a control signal $\overline{ce}$ for an interruption into the CPU control circuit CPU-CONT. This CPU control circuit CPU-CONT is interrupted by the control signal $\overline{ce}$ to control the CPU input/output port I/O$_2$, the input only port I and so on and to open the internal bus BUS. The control circuit WCON discriminates the voltage level fed from an external terminal V$_{pp}$ to control the write/-read operation modes and to feed its writing high voltage to the aforementioned EPROM. For example, if either a relative low voltage (e.g. 5 V) equal to an internal supply voltage Vcc or the ground potential (i.e., 0 V) of the circuit is supplied from the external terminal Vpp, the control circuit CCON generates a high-level discrimination signal. This high-level signal is used to establish the read operation mode, for example, when the EPROM is selected by the CPU. As a result, the verifying operation is made possible. If the writing high voltage (e.g., about 12 V) of the EPROM is fed from the external terminal Vpp, on the other hand, the control circuit WCON generates a low-level discrimination signal. For example, the data input buffer of the EPROM is rendered into its operative state in response to a low-level pulse generated by feeding the aforementioned high voltage Vpp for a predetermined period, and a write signal of a logic "0" generated by making use of the high voltage Vpp is prepared in accordance with the data fed from the data bus so that the logic "0" is written in a memory cell (e.g., a FAMOS transistor) selected. At this time, incidentally, the addressing of the EPROM is conducted in response to the address signal fed from the external terminal.

Moreover, the aforementioned address signal is fed to the address discrimination circuit contained in the aforementioned control circuit WCON. This address discrimination circuit inhibits the write operation and feeds out the read signal at that time as a blank (i.e, a logic "1"), although not limitative thereto, if it detects the set address other than those in the address space to which the EPROM is assigned. Incidentally, the aforementioned write inhibiting function need not be provided. This is because the non-existing address designation of the EPROM is conducted so that EPROM is not selected not to effect the writing operation.

Figure 2:
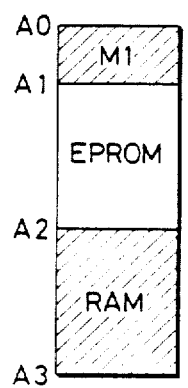
FIG. 2 is a diagram showing an address space for explaining the writing operation of the same.

The writing operation of the EPROM of the present embodiment will be schematically described with reference to the address space diagram of FIG. 2.

Let the case be considered, in which, of address spaces A0 to A3 set by the address bus ADD: the address of the input/output port is assigned from A0 to A1; the area of the EPROM is assigned to A1 to A2; and an RAM area is assigned to the remaining A2 to A3. In the writing operation of the EPROM by the writer, then, the continuous writing operations of the area A0 to A3 are conducted, and the blank (i.e., the logic "1") is written for the set addresses (i.e., the hatched areas) of those other than the aforementioned EPROM areas (A0 to A1 and A2 to A3) when in the verifying operation (e.g., the read check after the write). For these writing operations, the control circuit WCON makes its output blank (i.e., the logic "1") for the set addresses other than those of the aforementioned EPROM areas (A0 to A1 and A2 to A3) so that the continuous writing operation can be conducted without any write error.

Figure 3:
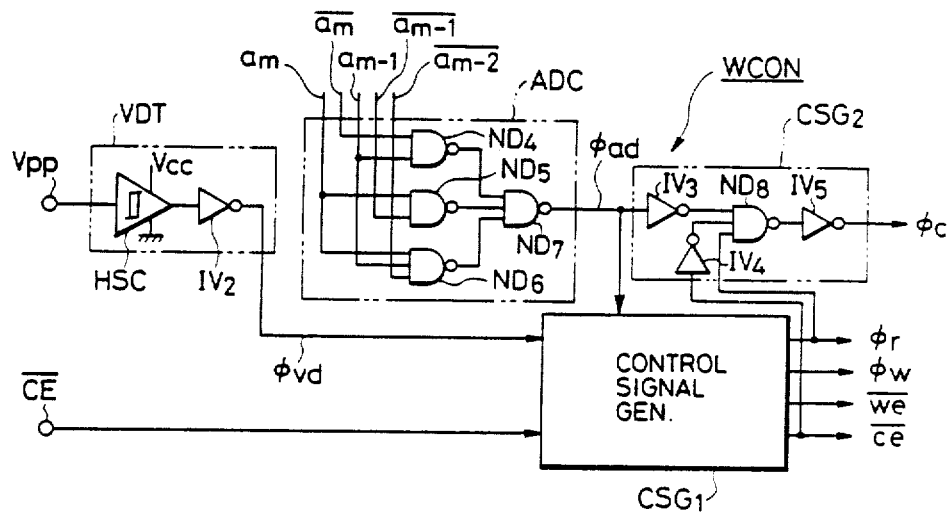
FIG. 3 is a specific circuit diagram showing a control circuit WCON of FIG. 1.

FIG. 3 shows a specific example of a circuit that can be used as the control circuit WCON of FIG. 1.

The control circuit WCON is constructed of a voltage level detector VDT, an address discriminator ADC, and first and second control signal generators CSG$_1$ and CSG$_2$.

The voltage level detector VDT is composed of an input circuit HSC for voltage level detection and an inverter IV$_2$ as a buffer. The input circuit HSC is made of a hysterisis circuit so that it may be insensitive to the undesired noises applied to the external terminal Vpp, although not limitative thereto. The hysterisis circuit is not shown in detail because it is known per se, and both its two threshold voltages are made to take intermediate values between the supply voltage Vcc of the circuit and the high voltage such as 12 V fed to the terminal Vpp. With the construction described above, the voltage level detector VDL outputs a high-level discrimination signal $\phi_{vd}$ substantially equal to the supply voltage Vcc, when the supply voltage Vcc of the circuit or the ground voltage is fed to the external terminal Vpp, and a low-level discrimination signal $\phi_{vd}$ substantially equal to 0 V when the high voltage as high as about 12 V is fed to the external terminal Vpp.

The address discriminator ADC is constructed to discriminate the address space of the EPROM with reference to the upper three bits of the (not-shown) address bus in the internal bus BUS, although not especially limitative thereto. More specifically, the output of a NAND circuit ND$_4$ is set at a low level only when the most significand bit am and the next significant am-1 of the address signal are at the logics "0" and "1", whereas the output of a NAND circuit ND$_5$ is set at a low level only when the bits am and am-1 are at "1" and "0". Likewise, the output of a NAND circuit ND$_6$ is set at the low level only when the bits am, am-1 and am-2 take the values "1", "1" and "0", respectively. In accordance with the outputs of those NAND circuits $ND_4$ to $ND_6$, the output of a NAND circuit $ND_7$, i.e., the output $\phi_{ad}$ of the address discriminator ADC is set at the high level, if the bits am, am-1 and am-2 are within the range "010" to "110", and otherwise at the low level. The output $\phi_{ad}$ is fed to the second control signal generator $CSG_2$ and to the first control signal generator $CSG_1$ as a kind of chip enable signal.

In response to the output $\phi_{vd}$ of the voltage level detector VDT, the chip enable signal fed through the external terminal $\overline{CE}$ and the output $\phi_{ad}$ of the address discriminator ADC, the first control signal generator $CSG_1$ outputs control signals $\phi_r$, $\phi_w$ and $\overline{we}$ necessary for the EPROM, and a control signal $\overline{ce}$ indicating the direct access mode of the EPROM.

The control signal $\overline{ce}$ is made substantially identical to the chip enable signal (which will be referred to as a $\overline{CE}$ signal) of the external terminal $\overline{CE}$, although not limitative thereto, such that it is set at the high level if the $\overline{CE}$ signal is at the high level, i.e., not the chip enable level, whereas it is set at the low level if the $\overline{CE}$ signal is at the low level, i.e., at the chip enable level.

The first control signal generator $CSG_1$ contains a not-shown OR circuit for generating the internal chip enable signal by OR composing the $\overline{CE}$ signal and an inverted level signal of the discrimination signal $\phi_{ad}$ outputted from the address discriminator ADC.

Although not especially limitative, the combination of the high level of the discrimination signal $\phi_{vd}$ and the chip enable level of the internal chip enable signal is deemed as the reading operation mode, whereas the combination of the low level of the discrimination signal $\phi_{vd}$ and the chip enable level of the internal chip enable signal is deemed as the program mode or the write mode. The non-chip enable level of the internal chip enable signal is deemed as a standby mode.

The control signal $\phi_r$ is used for controlling the operations of output buffer circuits $OB_1$ to $OB_n$ of the EPROM, as will be described later with reference to FIG. 4, so that it is set at the high level in the reading operation mode and at the low level in the remaining modes.

The control signal $\phi_w$ is used for controlling the operations of input buffers $DW_1$ to $DW_n$ of the EPROM so that it is set at the high level in the program mode and at the low level in the remaining modes.

The control signal $\overline{we}$ is changed in synchronism with the control signal $\phi_w$ so that it is set at the low level in the program mode and at the high level in the remaining modes.

The second control signal generator $CSG_2$ is composed, as shown in FIG. 3, of a NAND circuit $ND_8$ and inverter circuits $IV_3$ to $IV_5$ so that it outputs a control signal $\phi_c$ in response to the outputs $\phi_{ad}$ and $\overline{ce}$ of the address discriminator ADC and the output $\phi_r$ of the first control signal generator $CSG_1$. The control signal $\phi_c$ is set at the high level when the discrimination signal $\phi_{ad}$ and the control signal $\overline{ce}$ are at the low level and when the control signal $\phi_r$ is at the high level, i.e., when the reading operation mode is designated by the $\overline{CE}$ signal and the detection signal $\phi_{vd}$ and when the address other than those in the address space of the EPROM is designated by the address discriminator ADC.

Figure 4:
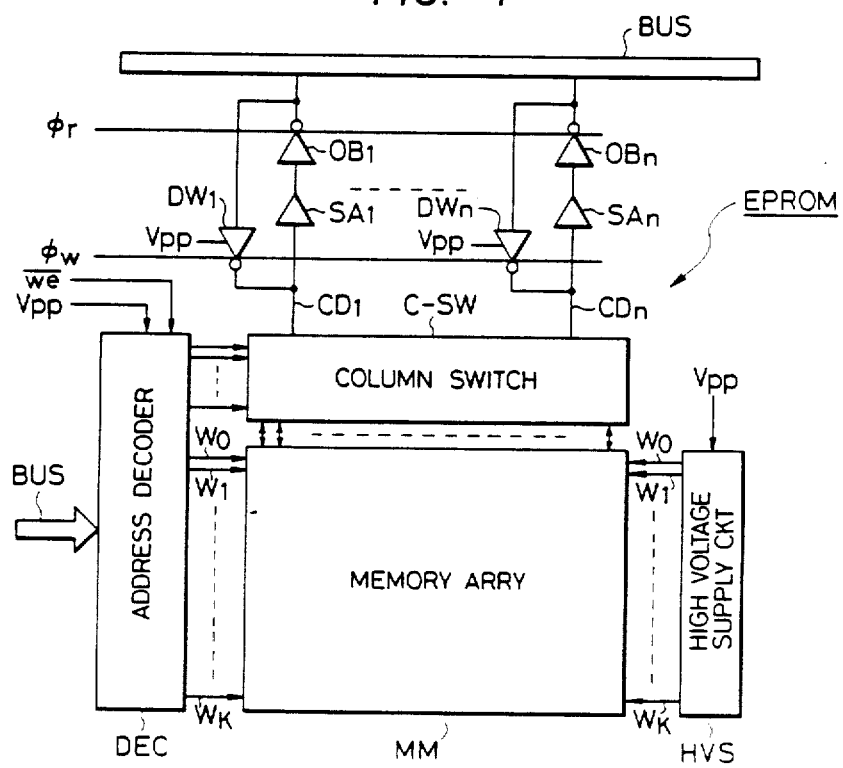
FIG. 4 is a specific circuit diagram showing an EPROM of FIG. 1.

The EPROM is composed, as shown in FIG. 4, of: an address decoder DEC made receptive of the address signal through the bus line BUS; an memory array MM having its word lines $W_0$ to $W_k$ selected by the address decoder DEC; a column switch C-SW connected between the memory array MM and common data lines $CD_1$ to $CD_n$ and adapted to be switched by the address decoder DEC; sense amplifiers $SA_1$ to $SA_n$ linked to the common data lines $CD_1$ to $CD_n$, respectively; the output buffer circuits $OB_1$ to $OB_n$ connected between the respective sense amplifiers $SA_1$ to $SA_n$ and the bus line BUS; the input buffer circuits $DW_1$ to $DW_n$ connected between the bus line BUS and the common data lines $CD_1$ to $CD_n$; and a high-voltage supply circuit connected between the each word line of the memory array MM and the external terminal Vpp.

The address decoder DEC is made receptive of not only the address signal but also the control signal $\overline{we}$ and the write voltage Vpp to output the selection signal substantially at the selection level of the supply voltage Vcc of the circuit and the selection signal substantially at the non-selection level of the ground potential of the circuit to the column switch C-SW and the word lines $W_0$ to $W_k$ of the memory array MM if the control signal $\overline{we}$ is at the high level. If the control signal $\overline{we}$ is generally at the low level of 0 V and the if the voltage Vpp is generally at the write level of 12 V, the selection level of the selection signal to be fed to the column switch C-SW is set generally at the write level. At this time, moreover, the word level to be selected from the word lines $W_0$ to $W_k$ is set generally at the write level by the high-voltage supply circuit HVS.

The output buffer circuits $OB_1$ to $OB_n$ have their operations controlled by the control signal $\phi_r$ such that they output such data signals to the bus line BUS if the control signal $\phi_r$ is at the high level as correspond to the data signals as outputted from the sense amplifiers $SA_1$ to $SA_n$. The output buffer circuits $OB_1$ to $OB_n$ are brought into their high-output impedance states if the control signal $\phi_r$ is at the low level.

The input buffer circuits $DW_1$ to $DW_n$ receive the voltage $V_{pp}$, and have their operations controlled by the control signal $\phi_w$. If the control signal $\phi_w$ is at the high level, the respective input buffer circuits $DW_1$ to $DW_n$ outputs such a signal at the level of 0 V or the $V_{pp}$ level to the respective common data lines $CD_1$ to $CD_n$ as corresponds to the data signal fed through the bus line BUS. If the control signal $\phi_w$ is at the low level, the respective input buffer circuits $DW_1$ to $DW_n$ are brought into the high-output impedance states.

As a result, when in the reading operation, the read data signals of the memory array MM fed to the respective common data lines $CD_1$ to $CD_n$ through the column switch C-SW are fed to the bus line BUS through the sense amplifiers $SA_1$ to $SA_n$ and the output buffers $OB_1$ to $OB_n$, respectively.

When in the writing operation, on the other hand, the high-voltage level write data signals outputted from the input buffer circuits $DW_1$ to $DW_n$ are fed to the memory array MM through the common data lines $CD_1$ to $CD_n$ and the column switch C-SW.

In accordance with the present embodiment, the input/output circuit $I/O_1$ has its construction modified slightly as the input/output circuit of the EPROM direct access mode for the ordinary input/output circuit.

Figure 5:
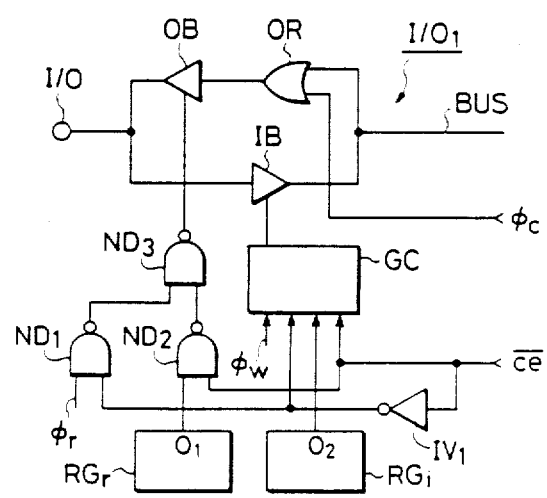
FIG. 5 is a specific circuit diagram showing input and output ports of FIG. 1.

A specific example of the construction of the input-/output circuit $I/O_1$ is shown in FIG. 5. The input/output circuit $I/O_1$ contains: circuits composing the ordinary input/output circuit such as an output buffer OB and an input buffer IB linked to an input/output terminal I/O and data transmission direction registers RGr and RGi having their respective contents determined by the control signals fed through the bus line BUS; NAND circuits $ND_1$ to $ND_3$, a gate circuit GC; an inverter circuit $IV_1$; and an OR circuit OR.

In accordance with this construction, the output of the NAND circuit $ND_3$, i.e., the control input of the output buffer circuit OB is made identical to the output $O_1$ of the register RGr, if the control signal $\overline{ce}$ is at the high level, and to the control signal $\phi_r$ if the control signal $\overline{ce}$ is at the low level.

The gate circuit GC is made substantially identical to the circuit composed of the NAND circuits $ND_1$ to $ND_3$. The output of the gate circuit GC, i.e., the control input of the input buffer circuit IB is made identical to the output $O_2$ of the register RGi, if the control signal $\overline{ce}$ is at the high level, and to the control signal $\phi_w$ if the control signal $\overline{ce}$ is at the low level.

The output of the OR circuit is set at the high level irrespective of the signal fed from the bus line BUS if the signal $\phi_c$ is at the high level.

As a result, the output buffer and input buffer OB and IB have their respective operations controlled by the registers RGr and RGi if the control signal $\overline{ce}$ is at the high level, in other words, if the EPROM direct access mode is not designated.

The output buffer OB and the input buffer IB have their respective operations controlled by the control signals $\phi_r$ and $\phi_w$ irrespective of the outputs $O_1$ and $O_2$ of the registers RGr and RGi if the control signal $\overline{ce}$ is at the low level, in other words, if the EPROM direct access mode is designated.

In the EPROM direct access mode (namely, $\overline{ce}$: at the low level), if the control signal $\phi_w$ is set at the high level, the input buffer IB is accordingly brought into its operative state. In accordance with this, the write data signal fed from the EPROM writer to the input/output terminal I/O is fed to the EPROM of FIG. 4 through the input buffer IB and the bus line BUS.

If the control signal $\phi_r$ is at the high level in the EPROM direct access mode, the output buffer OB is accordingly brought into its operative state. In accordance with this, the outputs of the output buffers $OB_1$ to $OB_n$ of FIG. 4 are outputted to the input/output terminal I/O through the OR circuit OR and the output buffer OB. If, at this time, the address space indicated by the address signal fed from the bus line BUS to the EPROM is out of that of the EPROM, the signal $\phi_c$ outputted from the circuit $CSG_2$ of FIG. 3 is set at the high level. In accordance with this, the signal at the high level is outputted from the output buffer OB of FIG. 5 irrespective of the signal level of the bus line BUS.

In the program of the EPROM by the EPROM writer, incidentally, either a socket especially for setting the semiconductor device of the present embodiment or a conversion socket for changing the pin arrangement is prepared and is linked to the socket which is mounted in the EPROM writer.

For verification of the EPROM, either the data corresponding to the address other than those of the address space of the EPROM or expectable values are all set at the (high level) "1". As a result, the signals outputted from the input/output circuit $I/O_1$ of FIG. 1 or 5 become coincident with the expectable values set in advance in the EPROM writer, when an address outside of the address space of the EPROM is designated.

According to the present invention, the following effects can be attained.

(1) By detecting the address designation in which the programmable ROM is not present and by blanking the read signal at that time, there can be attained an effect that the writer can continue its writing operation without any consideration into the ROM areas.

(2) Thanks to the effect (1), there can be attained another effect that the writing operation can be performed by the simplified writer which has the minimum writing function including the verifying operation.

(3) Thanks to the effects (1) and (2), there can be attained still another effect that a copying operation or the like can be easily conducted to write a plurality of semiconductor integrated circuit devices containing the programmable ROMs.

Although the present invention made by us has been described specifically in connection with the embodiment thereof, it should not be limited thereto but can naturally be modified in various manners within the scope of the gist thereof. For example, the programmable ROM should not be limited to the aforementioned EPROM but may be replaced by a variety of programmable ROMs such as an electrically writable PROM, e.g., an electrically erasable PROM EEPROM or an electrically unerasable PROM. In this modification, the control circuit WCON shown in FIG. 1 is made to conduct the write control according to the built-in programmable ROM. The signal level forcibly set when the address other those of the address space of the programmable ROM may be either at the high level or at the low level.

Although the foregoing description has been directed mainly to the case in which the present invention is applied to the one-chip microcomputer providing the background thereof and having the built-in EPROM, the present invention should not be limited thereto but may be widely applied to a variety of semiconductor integrated circuit devices containing the programmable ROM and having a larger address space than that of the former.

What is claimed is:

1. A one-chip microcomputer comprising:
   a bus;
   a microprocessor coupled to said bus;
   a random access memory which is coupled to said bus and which is coupled to said microprocessor via said bus so that said random access memory is accessed by said microprocessor, wherein said random access memory has a first predetermined address space defining a range of addresses assigned to the random access memory;
   an electrically programmable read only memory which has address input terminals and data input/output terminals coupled to said bus and which is accessed by either said microprocessor or from outside of said one-chip microcomputer, wherein said electrically programmable read only memory has a second predetermined address space defining a range of addresses assigned to the electrically programmable read only memory;
   a first external terminal coupled to said bus for transmitting an address signal from the outside of said one-chip microcomputer to said bus when said electrically programmable read only memory is accessed from the outside of said one-chip microcomputer;
   a second external terminal which is coupled to said bus via input/output means and to which either data signals to be read from said electrically programmable read only memory or data signals to be fed to said electrically programmable read only memory are provided;

discriminator means responsive to said address signal for discriminating whether or not said address signals is within the second predetermined address space of said electrically programmable read only memory; and means coupled to said input/output means and responsive to an output signal of said discriminator means for setting the data signals to be outputted to said second external terminal at a predetermined level indicating satisfactory operation of said electrically programmable read only memory if said address signal designates an address other than those within the second predetermined address space of said electrically programmable read only memory to prevent an improper indication of error in the electrically programmable read only memory.

2. A one-chip microcomputer according to claim 1, wherein said means for setting includes a control circuit responsive to the output signal of said discriminator means for providing a control signal to said input/output means so that said input/output means provides said data signal having the predetermined level to said second external terminal if said address signal designates an address other than those within the second predetermined address space of said electrically programmable read only memory.

3. A one-chip microcomputer according to claim 2, wherein said discriminator means includes a logic circuit which receives a part of said address signal and which provides said output signal if said address signals designates an address other than those within the second predetermined address space of said electrically programmable read only memory.

4. A one-chip microcomputer according to claim 1, wherein said electrically programmable read only memory is accessed from outside of the one-chip microcomputer to write data constituting a program into said electrically programmable read only memory from the outside of the one-chip microcomputer.

5. A microcomputer comprising:
a bus;
a microprocessor coupled to said bus;
a random access memory coupled to said bus, said random access memory being accessed by said microprocessor and having a first predetermined address space defining a range of addresses assigned thereto;
an electrically programmable read only memory having address input terminals and data output terminals each of which is coupled to said bus and being accessed by either said microprocessor or from outside of said microcomputer and having a second predetermined address space defining a range of addresses assigned thereto, wherein said electrically programmable read only memory is accessed from the outside of the microcomputer to write data into to the addresses within the second predetermined address space and to check the data written thereinto;
a first external terminal coupled to said bus and for providing an address signal from the outside of said microcomputer to said bus when said electrically programmable read only memory is accessed from the outside of said microcomputer;
a second external terminal for receiving either data signals to be written into said electrically programmable read only memory or data signals to be read out from said electrically programmable read only memory when said electrically programmable read only memory is accessed from the outside of said microcomputer;

discriminator means responsive to said address signal and for discriminating whether or not an address signal designated by said address signal is within the second predetermined address space; and providing means responsive to an output of said discriminator means and for providing a data signal having a predetermined level to said second external terminal when the address designated by said address signal is not within the second predetermined address space and for providing the data signal to be read out from said electrically programmable read only memory to said second external terminal when the address designated by said address signals is within said second predetermined address space.

6. A microcomputer according to claim 5, wherein said providing means is coupled to said bus to receive data supplied from said electrically programmable read only memory.

7. A microcomputer according to claim 5, wherein said discriminator means includes a logic circuit coupled to said bus to receive a part of said address signal.

8. A microcomputer according to claim 5, wherein said providing means includes a data output buffer and a control circuit coupled in series between said second external terminal and said bus, wherein said control circuit has a first input coupled to said bus and a second input coupled to receive said output of said discriminator means, and wherein said control circuit is controlled by said output of said discriminator means so that said providing means provides said data signal having a predetermined level to said second external terminal regardless of data to be supplied to said first input thereof from said bus when said address signal designates an address not within said second predetermined address space.

9. A microcomputer according to claim 5, wherein said electrically programmable read only memory is accessed from the outside of said microcomputer by a data writing unit to be coupled to said first and second external terminals.

10. A one-chip microcomputer including a random access memory, an electrically programmable read only memory capable of programming data constituting a program thereto from outside of the one-chip microcomputer and a microprocessor coupled to said random access memory and to said electrically programmable read only memory via bus and for executing a predetermined data processing operation in accordance with the program stored in said electrically programmable read only memory, wherein said microprocessor is capable of accessing a predetermined address within an address space which includes a predetermined first address space defining a range of addresses assigned to said random access memory and a predetermined second address space defining a range of addresses assigned to said electrically programmable read only memory, and wherein said electrically programmable read only memory is accessed from the outside of the one-chip microcomputer to store and check the data, said one-chip microcomputer comprising:
- a first external terminals coupled to said bus and for providing an address signals from the outside of said microcomputer to said bus when said electrically programmable read only memory is accessed from the outside of said microcomputer;
- a second external terminal for receiving either data signals to be written into said electrically programmable read only memory or data signals to be read out from said electrically programmable read only memory when said electrically programmable read only memory is accessed from the outside of said microcomputer; and
- means responsive to said address signal for providing a data signal having a predetermined level indicating satisfactory operation of said electrically programmable read only memory to said second external terminal when said address signal designates an address not within the second predetermined address space.

11. A one-chip microcomputer according to claim 10, wherein said means for providing a data signal having a predetermined level comprises:
- discriminator means responsive to said address signal and for discriminating whether or not an address designated by said address signal is within the second predetermined address space; and
- providing means responsive to an output of said discriminator means and for providing said data signal having a predetermined level to said second external terminal when the address designated by said address signal is not within the second predetermined address space and for providing the data signal read out from said electrically programmable read only memory to said second external terminal when the address designated by said address signal is within said second predetermined address space.

12. A one-chip microcomputer according to claim 11, wherein said providing means is coupled to said bus to receive data signals supplied from said electrically programmable read only memory.

13. A one-chip microcomputer according to claim 11, wherein said discriminator means includes a logic circuit coupled to said bus to receive a part of said address signal.

14. A one-chip microcomputer according to claim 11, wherein said providing means includes a data output buffer and a control circuit coupled in series between said second external terminal and said bus, wherein said control circuit has a first input coupled to said bus and a second input coupled to receive said output of said discriminator means, and wherein said control circuit is controlled by said output of said discriminator means so that said providing means provides said data signal having a predetermined level to said second external terminal regardless of data to be supplied to said first input thereof from said bus when said address signal designates an address not within said second predetermined address space.

15. A one-chip microcomputer according to claim 10, wherein said electrically programmable read only memory is access from the outside of said microcomputer by a data writing unit to be coupled to said first and second external terminals.

* * * * *